US007577951B2

(12) United States Patent
Partamian et al.

(10) Patent No.: US 7,577,951 B2
(45) Date of Patent: Aug. 18, 2009

(54) PERFORMANCE OF COMPUTER PROGRAMS WHILE THEY ARE RUNNING

(75) Inventors: Noubar Partamian, Mountain View, CA (US); Laurent Morichetti, San Jose, CA (US); Amitabh Nene, Santa Clara, CA (US); Andrew Trick, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 10/159,528

(22) Filed: May 30, 2002

(65) Prior Publication Data

US 2003/0225917 A1    Dec. 4, 2003

(51) Int. Cl.
*G06F 9/44* (2006.01)
*G06F 9/455* (2006.01)

(52) U.S. Cl. .................. 718/1; 717/114; 717/127; 717/131; 717/168

(58) Field of Classification Search ......... 718/100–104, 718/1; 717/111, 116, 140–148, 166, 114, 717/127, 131, 168
See application file for complete search history.

(56) References Cited

U.S. PATENT DOCUMENTS

| | | | | |
|---|---|---|---|---|
| 4,849,880 A * | 7/1989 | Bhaskar et al. | ............. | 717/109 |
| 6,202,208 B1 * | 3/2001 | Holiday, Jr. | ................. | 717/166 |
| 6,286,136 B1 * | 9/2001 | Watanabe et al. | ........... | 717/116 |
| 6,289,506 B1 | 9/2001 | Kwong et al. | | |
| 6,295,643 B1 * | 9/2001 | Brown et al. | ................. | 717/148 |
| 6,629,113 B1 * | 9/2003 | Lawrence | ................... | 707/206 |
| 6,842,897 B1 * | 1/2005 | Beadle et al. | .................. | 718/1 |
| 6,865,732 B1 * | 3/2005 | Morgan | ...................... | 717/140 |
| 7,017,151 B1 * | 3/2006 | Lopez et al. | ................ | 717/127 |
| 7,089,544 B2 * | 8/2006 | Hickson | ..................... | 717/148 |
| 2004/0064552 A1 * | 4/2004 | Chong et al. | ................ | 709/224 |

OTHER PUBLICATIONS

Morajko et al., "Automatic Performance Analysis and Dynamic Tuning of Distributed Applications", Parallel Processing Letters, 2003, pp. 1-20.*
Malabarba et al., "Runtime Support for Type-Safe Dynamic Java Classes", Parallel and Distributed Computing Laboratory, Computer Science Department, University of California, 2000, pp. 1-34.*
"The Jalapeno Virtual Machine" B. Alpern, et al. IBM Systems Journal, IBM Corp. Armonk, New York, US vol. 39, Nov. 1, 2000, pp. 211-238.
"A Method For Enabling Comprehensive Profiling Of Garbage-Collected Memory Systems" Sheng Liang, et al., Sun Microsystems, Inc. PCT—WO 00/33192, Internation Pub. No., Jun. 8, 2000.

* cited by examiner

*Primary Examiner*—Lewis A Bullock, Jr.
*Assistant Examiner*—Jennifer N To

(57) ABSTRACT

The present invention, in various embodiments, provides techniques for improving performance of programs. In one embodiment, the program is written in the Java language and runs in the Java Runtime Environment (JRE) that includes a Java Virtual Machine (JVM) having a configuration. A control panel having access to the JVM is invoked. Via the control panel, a user observes the execution of the Java program, analyzes the results of the execution, changes the configuration of the JVM, and forces re-optimization of the critical portions of the running program. By repeating the above steps of observing the program execution, analyzing the results, changing the configuration of the Java machine, and forcing re-optimization of the critical portions of the program, the user improves the program's overall performance.

18 Claims, 3 Drawing Sheets

PERFORMANCE OF COMPUTER PROGRAMS WHILE THEY ARE RUNNING

FIELD OF THE INVENTION

The present invention relates generally to computer programs and, more specifically, to improving performance of such programs while they are running.

BACKGROUND OF THE INVENTION

Application programs running acceptably at first can become poor performers after being executed over time because of various reasons including changes in the workload characteristics of the programs. For example, in the Java Runtime Environment (JRE), the Java Virtual Machine (JVM) relies on a dynamic optimizing compiler to speed up execution of Java applications. While the application runs, the JVM identifies the most frequently invoked methods, i.e., "hot" methods, optimizes them, and places the optimized methods in a code cache so that subsequent invocations of these methods are more efficient as the cached versions of the methods are used. Code cache is a designated area in memory that stores optimized code of hot methods. A set of hot methods is usually associated with a particular type of load or the set of actions performed by the program. A program running two different loads provides two different sets of hot methods. For example, a tax program when preparing tax for an individual is associated with a set of hot methods different from a set of hot methods associated with the same tax program preparing tax for a corporation because the methods preparing the tax for an individual are different from the methods preparing tax for a corporation. Consequently, hot methods are usually identified when there is change in the program load. As additional hot methods are identified and optimized, the application runs more efficiently. However, after the application runs for some time, the hot methods reach a steady state, i.e., no new hot methods can be identified. Application performance depends on how well the steady state methods are optimized.

Thresholds affecting the level and scope of application optimization are usually preset when the Java environment is shipped to customers. Both aggressive and conservative thresholds can lead to poor performance. For example, an aggressive threshold for a larger amount of code of a method to be inlined during compilation can cause excessive instruction cache (I-cache) misses, while a conservative threshold leaves larger portions of the code un-optimized. Both situations lead to poor application performance.

Typically, when a user recognizes a poorly performing application, the user examines the application, identifies the parameters in the JVM that affect application performance, and reassigns more suitable values to these parameters. However, for the new changes to be effective, a new environment based on the modified parameters must be installed, and this requires turning off the existing application. During the time the application is turned off, it cannot be used, resulting in business disruptions. In various situations, to correct the problem, the user is required to work with the business institution providing the Java environment. In these situations, the user has to be physically present at the site of the institution, where the application's software and hardware environments and the conditions leading to the poor performance would need to be reproduced, all of which could be very costly. In many situations, producing the conditions causing the poor performance is not easy. Further, after the application is debugged, the new Java environment is typically modified, the user then has to install the new Java environment including the modifications in the user's machine. This also requires that the application be turned off and results in disruptions as discussed above.

Based on the foregoing, it is desirable that mechanisms be provided to solve the above deficiencies and related problems.

SUMMARY OF THE INVENTION

The present invention, in various embodiments, provides techniques for improving performance of programs. In one embodiment, the program is written in the Java language and runs in the Java Runtime Environment (JRE) that includes a Java Virtual Machine (JVM) having a configuration. A control panel having access to the JVM is invoked. Via the control panel, a user observes the execution of the Java program, analyzes the results of the execution, changes the configuration of the JVM, and forces re-optimization of the critical portions of the running program. By repeating the above steps of observing the program execution, analyzing the results, changing the configuration of the Java machine, and forcing re-optimization of the critical portions of the program, the user improves the program's overall performance.

BRIEF DESCRIPTION OF THE DRAWINGS

The present invention is illustrated by way of example in the figures of the accompanying drawings in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Figure 1:
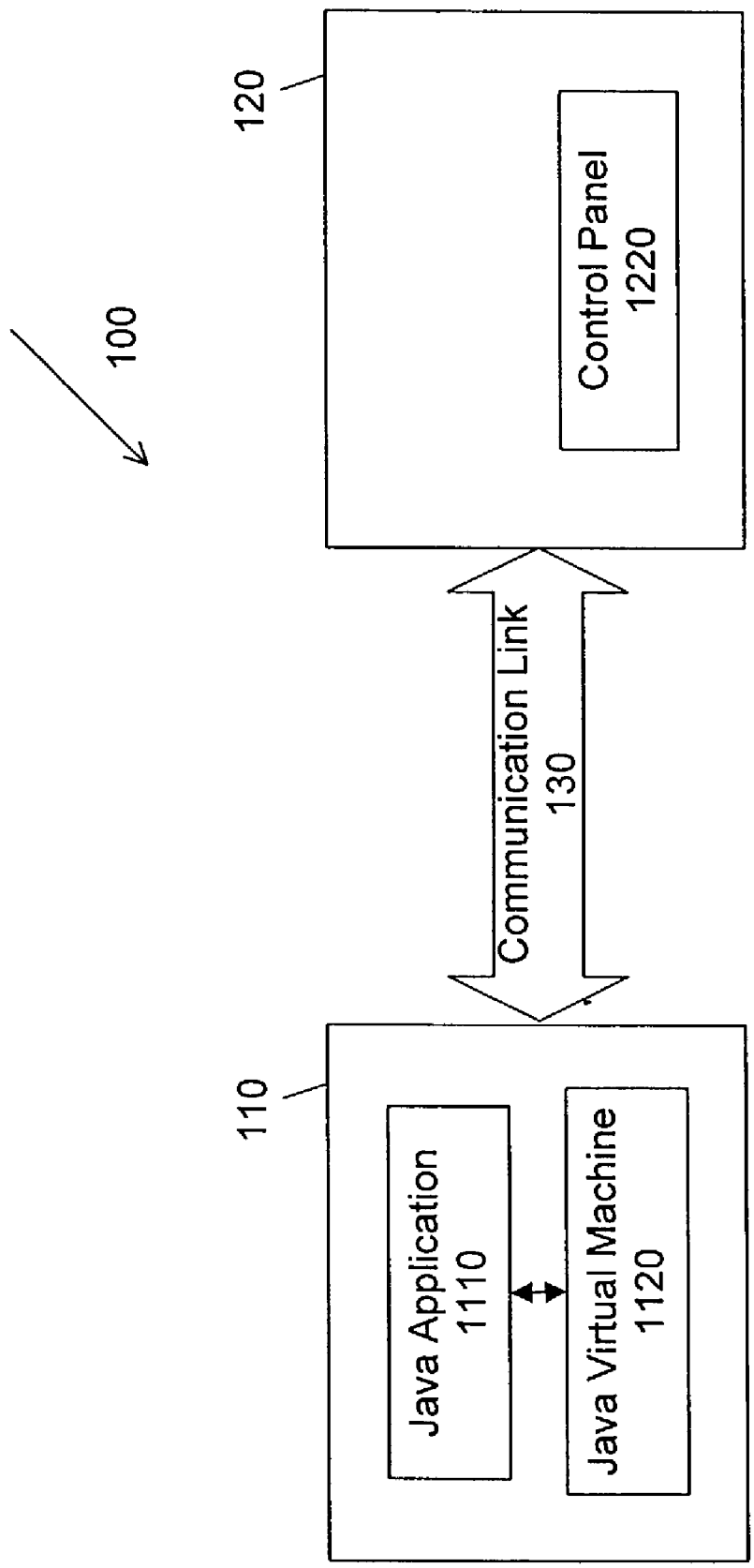
FIG. 1 shows a system upon which embodiments of the invention may be implemented.

FIG. 1 shows a system 100 upon which embodiments of the invention may be implemented. System 100 includes a first computer 110 and a second computer 120, which, for illustration purposes, are referred to as an application server 110 and a performance debugging machine 120, respectively. Server 110 and machine 120 are connected via a communication link 130.

Server 110 runs various application programs one of which is shown as a program 1110. In one embodiment, program 1110 is a Java program working within a Java Runtime Environment (JRE) that includes a Java Virtual Machine (JVM) 1120. Typically, program 1110 is optimized and executed under the control of JVM 1120. Program 1110 in turn provides services to users normally over a network such as communication link 130, the Internet, etc. These services include, for example, web, database, e-mail, security, communications, etc.

Java Virtual Machine 1120 provides an environment for executing Java bytecode independent of the computer platform on which JVM 1120 runs. Generally, JVM 1120 is implemented in software running on the hardware and operating system of server 110. JVM 1120 thus provides an environment allowing a generic program representation in the form of bytecode to be executed on server 110. JVM 1120 is responsible for optimizing the Java program and translating the Java bytecode into actions performed by server 110. JVM 1120 includes various parameters that affect the performance of application programs, e.g., program 1110.

Machine 120 includes a monitor or screen on which a control panel 1220 can be displayed. In this FIG. 1 example, control panel 1220 is remote from server 110, i.e., control panel 1220 communicates with server 110 via communication link 130. However, control panel 1220 can be local, e.g., displayed on a monitor local to server 110. In one embodiment, control panel 1220 is a software package invoked from JVM 1120 that allows a user to access and modify JVM 1120. Further, via control panel 1220 in the form of a graphical user interface (GUI), a customer support engineer associated with the institution providing the Java environment remotely analyzes and improves performance of program 1110.

Communication link 130 is a mechanism for server 110 to communicate with machine 120. Communication link 130 may be a single network or a combination of networks that utilizes one or a combination of communication protocols such as the Transmission Control Protocol/Internet Protocol (TCP/IP), the Public Switched Telephone Network (PSTN), the Digital Subscriber Lines (DSL), the cable network, the satellite-compliant, the wireless-compliant, etc. In one embodiment, communication link 130 is the Internet.

Configuration of the Java Virtual Machine

Java Virtual Machine 1120 performs various functions and includes various parameters both of which affect performance of program 1110. For example, JVM 1120 performs garbage collection that manages data in memory of server 110 so that running Java programs do not run out of memory. Managing memory takes time and resources, hence could affect performance of program 1110. Changing the frequency of garbage collection changes performance of program 1110. In one embodiment, JVM 1120 includes a threshold to indicate how often garbage collection should be performed and mechanisms to indicate the priority for the memory block to have garbage collection performed. Heap refers to the memory location where the garbage collected objects are placed. When the heap is filled, the garbage collector starts. A smaller heap causes garbage collection to occur more often and thus can degrade system performance. JVM 1120 includes a parameter for adjusting the heap size.

"Hot" Java program methods are invoked quite often and are executed in the compiled form instead of in the interpreted form because executing compiled methods runs faster than executing interpreted methods. In one embodiment, JVM 1120 includes a threshold to determine whether a method is hot or not. For example, a threshold of 5000 indicates that a method is not considered a hot method until it is invoked by at least 5000 times. Similarly, a threshold of 10000 indicates that the method is not considered a hot method until it is invoked by at least 10000 times, etc. As hot methods are frequently invoked in a program, a set of hot methods may be referred to as critical portions of the program.

Java methods can be compiled with different levels of aggressiveness. A more aggressively compiled method can have a larger scope or region of code considered for optimization and thus more code to compile than a less aggressively compiled method. This can result in longer time to compile and/or higher Instruction-cache miss rate because a more aggressively compiled method with a lot of code may not be stored in cache as often as a method with less code. In one embodiment, JVM 1120 includes various flags for a user to set the aggressiveness of compiling a method. JVM 1120 also allows mechanisms for forcing a method to be compiled on demand. In one embodiment, since the compiler is an "optimizing compiler," forcing recompilation may be referred to as forcing optimization, and what and/or how much to optimize is based on the parameters and/or the thresholds used by the optimizing compiler. Further, since hot methods may be referred to as critical portions of the program, forcing recompilation of hot methods may be referred to as forcing optimization of the program.

JVM 1120 also includes mechanisms to force on-stack replacement, which refers to replacing a portion of the program while it is running, usually by a better optimized version of the portion or of a method.

When JVM 1120 is first installed in server 110, it is configured to a set of parameters and thus is to execute some predefined functions. However, a user, e.g., via control panel 1220, can adjust these parameters while application program 1110 and JVM 1120 are running.

Modifying Configuration of the Java Virtual Machine

Embodiments of the invention allow a user to change configuration of JVM 1120 in real time or "on the fly," which normally refers to the fact that program 1110 is running or being executed. Changing configurations of JVM 1120 includes adjusting various parameters and thresholds, and is applicable when tuning, debugging, and/or improving performance of application 1110 and/or JVM 1120 is desirable. For illustration purposes, the term improving performance is used in this document. However, the illustrative concept is applicable to improving, tuning, debugging and their equivalences. Tuning JVM 1120 typically occurs when new functionality is added to application 1110, loads of application 1110 change, a new version of JVM 1120 is introduced, a new application is first run with JVM 1120, etc.

Via control panel 1220, a user can activate tracing of JVM 1120, e.g., by setting a tracing property inside JVM 1120 to its "on" position. Through tracing, the user acquires information useful to identify the cause of the poor performance. The user then analyses the acquired information, and, as appropriate, changes the configuration of JVM 1120. Changing configuration of JVM 1120 includes adjusting various thresholds, which control the frequency and duration of various actions performed by JVM 1120, or which directly affect the optimization level of program 1110 such as which parts of the program to process through the optimizing compiler of JVM 1120, etc. For example, the user may change the frequency for garbage collection and instantly activate the new frequency, re-generate the code in the code cache, etc.

Depending on parameters and implementations, each parameter in JVM 1120 corresponds to a control mechanism such as an on/off button, a sliding bar, a selection list displayed on control panel 1220, etc. A user adjusts the corresponding control mechanism to adjust the parameter. For example, for forced compilation or forced on stack replacement, a method corresponds to an on/off button, and clicking on this button enables or disables the corresponding forced compilation or forced on stack replacement. For another example, a parameter to set a threshold such as the threshold to trigger garbage collection, or a threshold to indicate a method as being hot, etc., is represented by a sliding bar corresponding to the range of the threshold values. Adjusting the sliding bar adjusts the corresponding threshold value.

In one embodiment, parameters desirable to be adjustable while program 1110 is running are stored in server 110's shared memory, which refers to an area of memory that can be modified by more than one process. Both control panel 1220 and JVM 1120 are considered two processes having access to this shared memory. Via control panel 1220 as a process, a user changes the parameter values in the shared memory and thus allows application program 1110 to be instantly executed with the newly changed parameters, resulting in real time improving performance of application 1110. In an alternative embodiment, the parameters are stored in the data space of JVM 1120, and control panel 1220 and JVM 1120 remain two processes. The user then uses the InterProcess Communication (IPC) protocol to directly adjust the parameters in the data space of JVM 1120. In an alternative embodiment, control panel 1220 is part of JVM 1120, and the user via control panel 1220 changes the parameters from JVM 1120's data space. A process may be defined as an executing program or a task, which refers to a combination of a program and book keeping information used by the operating system. The task identifies the program with a task number. A process may be created within a thread that can execute independently of other parts of the process.

A user via control panel 1220 may observe in real time performance of program 1110, and take appropriate actions to improve such performance. For example, the user activates the tracing feature of JVM 1120 that allows the user to see how program 1110 and JVM 1120 are running, to identify what methods of program 1110 are compiled versus interpreted, what the cache miss rate is, to what values the threshold of the various parameters are set, etc. Based on the observation and the data acquired in real time, the user solves the problems by analyzing the existing data, experimenting by running program 1110 with various sets of new data and new configurations of JVM 1120, etc. When desired, the user uses available performance tools to analyze the data, program 1110, JVM 1120, etc. Examples of performance analysis tools include Prospect, Gprof, Vtune by Intel of Santa Clara, Calif., HPJmeter and Glance by Hewlett-Packard Company of Palo Alto, Calif., etc. For example, observing that a method is invoked quite often but its corresponding hot method threshold is set at too high a value, the user decreases this value so that this method is considered a hot method and is thus run in the compiled form instead of the interpreted form. In contrast, if a method causes too many cache misses because the method is compiled too aggressively, then the user recompiles the method with a less aggressive option. To help the debugging process, the user forces compilation of a method A and/or forces on stack replacement of a method B, etc.

In one embodiment, after each debugging session, a configuration template for JVM 1120 is created and stored, e.g., in a file, which holds the new values of the various parameters in JVM 1120. Each template is thus usually associated with a specific and well-defined program load and environment under which application 1110 is debugged and run. Configuration templates provide the customer with a quick way of reconfiguring JVM 1120 to be used in similar situations. For example, a template T1 is created when application 1110 is heavily running database requests, a template T2 is created when application 1110 is running web services, etc. When applications running the database or the web service occur, the user can quickly load template T1 or T2, respectively.

Steps Illustrating a Method for Improving Program Performance

Figure 2:
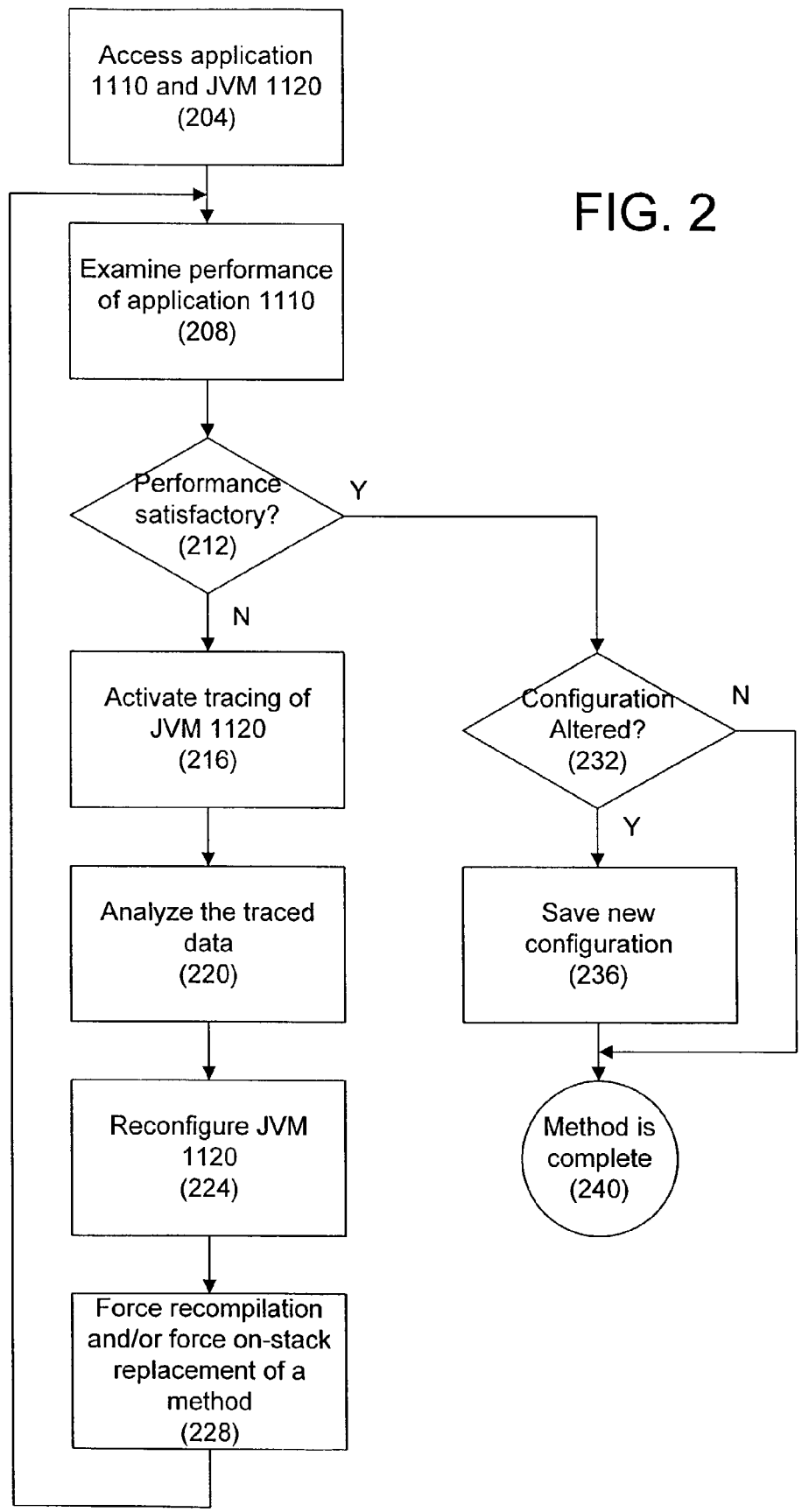
FIG. 2 is a flowchart illustrating a method for improving performance of a program in accordance with one embodiment.

FIG. 2 is a flowchart illustrating a method for improving program performance in accordance with one embodiment.

In step 204, a user uses control panel 1220 to access application 1110 and Java Virtual Machine 1120.

In step 208, the user examines the performance of application 1110.

In step 212, the user determines whether the performance of application 1110 is satisfactory. If the performance is unsatisfactory, then the user, in step 216, activates tracing of JVM 1120.

In step 220, the user analyzes the traced data.

In step 224, the user reconfigures JVM 1120, e.g., by changing various thresholds and/or parameters.

In step 228, the user, if necessary, forces recompilation of hot methods and/or forces on-stack replacement of some currently running methods, etc.

The user then repeats the above steps, 208, 212, 216, 220, 224 and 228 until the user in step 212 determines that the performance of application 1110 is satisfactory. When the performance is satisfactory, the user, in step 232, determines if the configuration of JVM 1120 has been altered, and if so, the user in step 236 saves the new configuration. The method is complete in step 240. However, if the configuration of JVM 1120 has not been altered, then the user skips the step of saving the configuration in step 236, and the method is complete in step 240.

Embodiments of the invention provide several benefits. For illustration purposes, the term tuning is used, but the benefits are applicable in other similar situations such as improving performance, adjusting parameters, etc. Tuning application 1110 can be performed under real loads, in real time, remotely from the location application 1110 is running. There is no need to build a separate tuning environment. As tuning becomes simple, easy and inexpensive, it can be performed more frequently.

Computer System Overview

Figure 3:
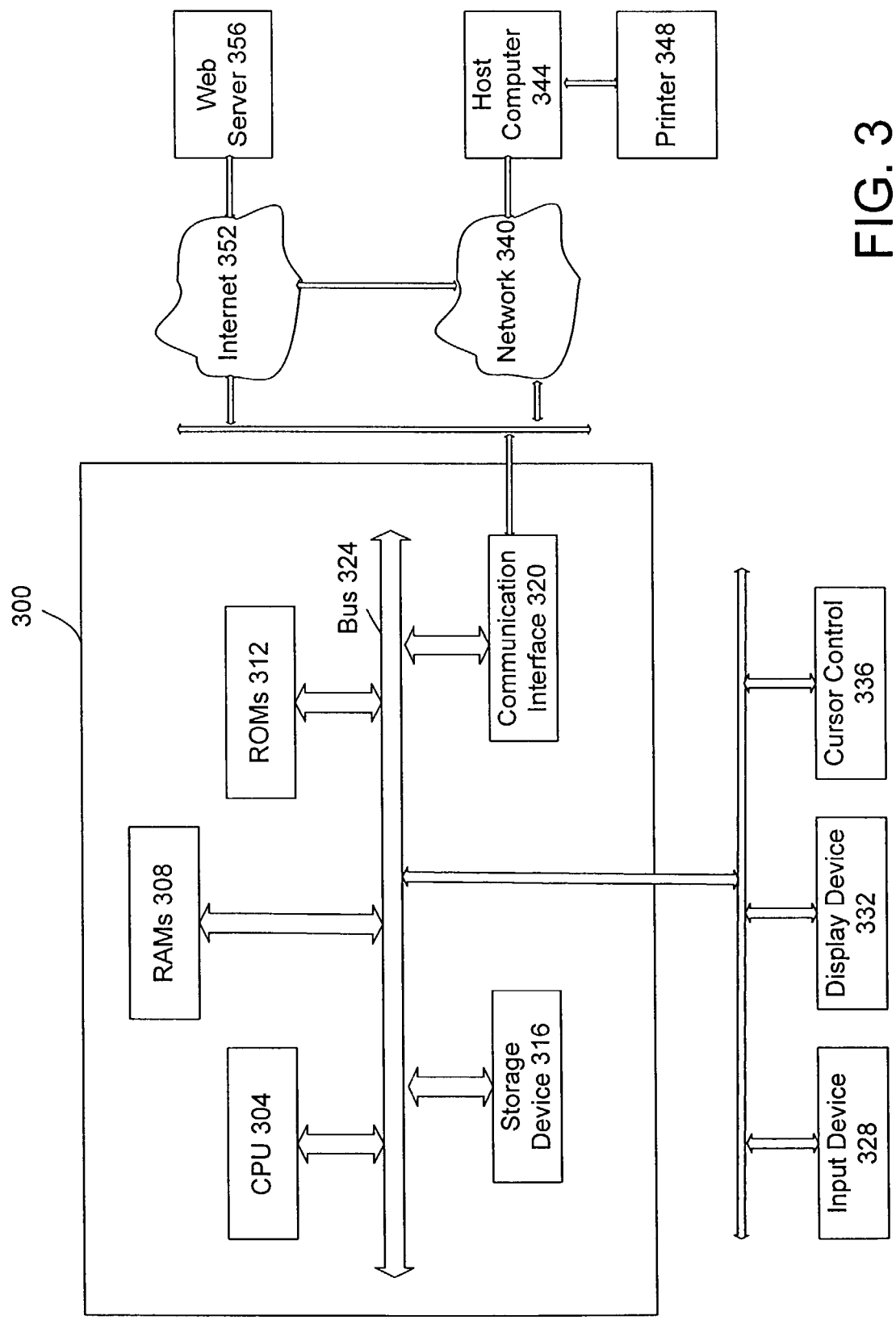
FIG. 3 is a computer system upon which embodiments of the inventions may be implemented.

FIG. 3 is a block diagram showing a computer system 300 upon which one embodiment of the invention may be implemented. For example, computer system 300 may be implemented to operate as server 110 or as debugging machine 120, etc. In one embodiment, computer system 300 includes a central processing unit (CPU) 304, random access memories (RAMs) 308, read-only memories (ROMs) 312, a storage device 316, and a communication interface 320, all of which are connected to a bus 324.

CPU 304 controls logic, processes information, and coordinates activities within computer system 300. In one embodiment, CPU 304 executes instructions stored in RAMs 308 and ROMs 312, by, for example, coordinating the movement of data from input device 328 to display device 332. CPU 304 may include one or a plurality of processors.

RAMs 308, usually being referred to as main memory, temporarily store information and instructions to be executed by CPU 304. Information in RAMs 308 may be obtained from input device 328 or generated by CPU 304 as part of the algorithmic processes required by the instructions that are executed by CPU 304.

ROMs 312 store information and instructions that, once written in a ROM chip, are read-only and are not modified or removed. In one embodiment, ROMs 312 store commands for configurations and initial operations of computer system 300.

Storage device 316, such as floppy disks, disk drives, or tape drives, durably stores information for use by computer system 300.

Communication interface 320 enables computer system 300 to interface with other computers or devices. Communication interface 320 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 320 may also allow wireless communications.

Bus 324 can be any communication mechanism for communicating information for use by computer system 300. In the example of FIG. 3, bus 324 is a media for transferring data between CPU 304, RAMs 308, ROMs 312, storage device 316, communication interface 320, etc.

Computer system 300 is typically coupled to an input device 328, a display device 332, and a cursor control 336. Input device 328, such as a keyboard including alphanumeric and other keys, communicates information and commands to CPU 304. Display device 332, such as a cathode ray tube (CRT), displays information to users of computer system 300. Cursor control 336, such as a mouse, a trackball, or cursor direction keys, communicates direction information and commands to CPU 304 and controls cursor movement on display device 332.

Computer system 300 may communicate with other computers or devices through one or more networks. For example, computer system 300, using communication interface 320, communicates through a network 340 to another computer 344 connected to a printer 348, or through the world wide web 352 to a server 356. The world wide web 352 is commonly referred to as the "Internet." Alternatively, computer system 300 may access the Internet 352 via network 340.

Computer system 300 may be used to implement the techniques described above. In various embodiments, CPU 304 performs the steps of the techniques by executing instructions brought to RAMs 308. In alternative embodiments, hardwired circuitry may be used in place of or in combination with software instructions to implement the described techniques. Consequently, embodiments of the invention are not limited to any one or a combination of software, firmware, hardware, or circuitry.

Instructions executed by CPU 304 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, capacitive or inductive coupling, etc. As an example, the instructions to be executed by CPU 304 are in the form of one or more software programs and are initially stored in a CD-ROM being interfaced with computer system 300 via bus 324. Computer system 300 loads these instructions in RAMs 308, executes some instructions, and sends some instructions via communication interface 320, a modem, and a telephone line to a network, e.g. network 340, the Internet 352, etc. A remote computer, receiving data through a network cable, executes the received instructions and sends the data to computer system 300 to be stored in storage device 316.

In the foregoing specification, the invention has been described with reference to specific embodiments. However, it will be evident that various modifications and changes may be made without departing from the broader spirit and scope of the invention. Accordingly, the specification and drawings are to be regarded as illustrative rather than as restrictive.

What is claimed is:

1. A method of improving performance of a computer program, comprising the steps of:

activating a tracing feature of a virtual machine;

running the program on the virtual machine, the virtual machine having a parameter affecting the performance of the program, the parameter having a value, the virtual machine providing an execution environment for the program, the program being written in a language interpreted by the virtual machine;

adjusting the value of the parameter to a new value, via an invoked control panel having access to the program execution, the virtual machine, and the parameter, and continuing executing the program with the parameter having the new value without requiring reinitiating execution of the program; and taking an action based on a result of analyzing the continuing program execution, and repeating the steps of adjusting, executing, and analyzing as needed.

2. The method of claim 1 wherein the program is written in the Java language and the virtual machine is the Java virtual machine.

3. The method of claim 1 wherein the step of taking is selected from one or a combination of forcing compilation of a method of the program, forcing on-stack replacement of a method of the program, reconfiguring memory heap of the computer executing the program, performing garbage collection on memory of the computer, and reconfiguring the virtual machine.

4. The method of claim 1 wherein the value of the parameter is stored in shared memory accessible to the control panel and to the virtual machine.

5. The method of claim 1 wherein the steps of adjusting uses an InterProcess Communication protocol.

6. The method of claim 1 wherein the parameter is part of a configuration of the virtual machine.

7. The method of claim 1 further comprising the step of displaying the control panel on a screened device connected via a network to the computer running the program.

8. The method of claim 1 further comprising the step of saving the new value for latter use.

9. A method of tuning a virtual machine, comprising:

activating a tracing feature of a virtual machine;

executing a program and thereby invoking the virtual machine, wherein the virtual machine has a configuration affecting the performance of the program, and wherein the virtual machine provides an environment for executing program code of the program;

adjusting the configuration of the virtual machine via an invoked control panel having access to the program execution and the configuration of the virtual machine, based on the result of analyzing the data resulting from the execution of the program;

running the program with the adjusted configuration of the virtual machine without requiring reinitiating execution of the program; and repeating the steps of adjusting, running and taking an action as needed.

10. A computer-readable storage medium comprising a set of instructions for execution by a computer system, the computer-readable storage further comprising:

a control panel having access to execution of a program and to a virtual machine having a parameter, the virtual machine providing an environment for executing program code of the program, the parameter affecting the performance of the program and having a value, wherein while the program and the virtual machine are running, the control panel allows activating a tracing feature of the virtual machine, allows adjusting the value of the parameter to a new value, allows the execution of the program with the parameter having the new value without requiring reinitiating execution, allows taking an action based on a result of analyzing the program execution and allows repeating the adjusting, the execution, and the taking an action as needed.

11. The computer-readable storage medium of claim 10 wherein the program is written in the Java language and the virtual machine is the Java virtual machine.

12. The computer-readable storage medium of claim 10 wherein the control panel further allows one or a combination of forcing compilation of a system of the program, forcing on-stack replacement of a system of the program, reconfiguring memory heap of the computer executing the program, performing garbage collection on memory of the computer, and reconfiguring the virtual machine.

13. The computer-readable storage medium of claim 10 wherein the value of the parameter is stored in shared memory accessible to the control panel and to the virtual machine.

14. The computer-readable storage medium of claim 10 wherein the control panel further allows using an InterProcess Communication protocol to adjust the value of the parameter.

15. The computer-readable storage medium of claim 10 wherein the parameter is part of a configuration of the virtual machine.

16. The computer-readable storage medium of claim 10 further comprising a screen device displaying the control panel; the screen device being connected via a network to the system running the program.

17. The computer-readable storage medium of claim 10 further comprising means for saving the new value for latter use.

18. A computer-readable storage medium comprising a set of instructions for execution by a computer system, the computer-readable storage medium further comprising:

a control panel having access to execution of a program and to a configuration of the virtual machine, the virtual machine providing an environment for executing program code of the program, wherein the execution of the program invokes the virtual machine and the configuration affects performance of the program, and while the program and the virtual machine are being executed, the control panel allows activating a trace feature of the virtual machine, allows adjusting the configuration of the virtual machine based on analyzing data resulting from the execution of the program, allows using the adjusted configuration of the virtual machine and executing the program without requiring reinitiating execution of the program, and allows repeating the adjusting and the executing as needed.

* * * * *

UNITED STATES PATENT AND TRADEMARK OFFICE
CERTIFICATE OF CORRECTION

PATENT NO. : 7,577,951 B2
APPLICATION NO. : 10/159528
DATED : August 18, 2009
INVENTOR(S) : Noubar Partamian et al.

It is certified that error appears in the above-identified patent and that said Letters Patent is hereby corrected as shown below:

In column 8, line 47, in Claim 7, delete "screened" and insert -- screen --, therefor.

Signed and Sealed this

Sixteenth Day of March, 2010

David J. Kappos
*Director of the United States Patent and Trademark Office*